Mar. 27, 1923.
M. G. McNEELY.
FRONT DRIVE FOR MOTOR VEHICLES.
FILED OCT. 15, 1921.
1,450,099.
2 SHEETS—SHEET 1.
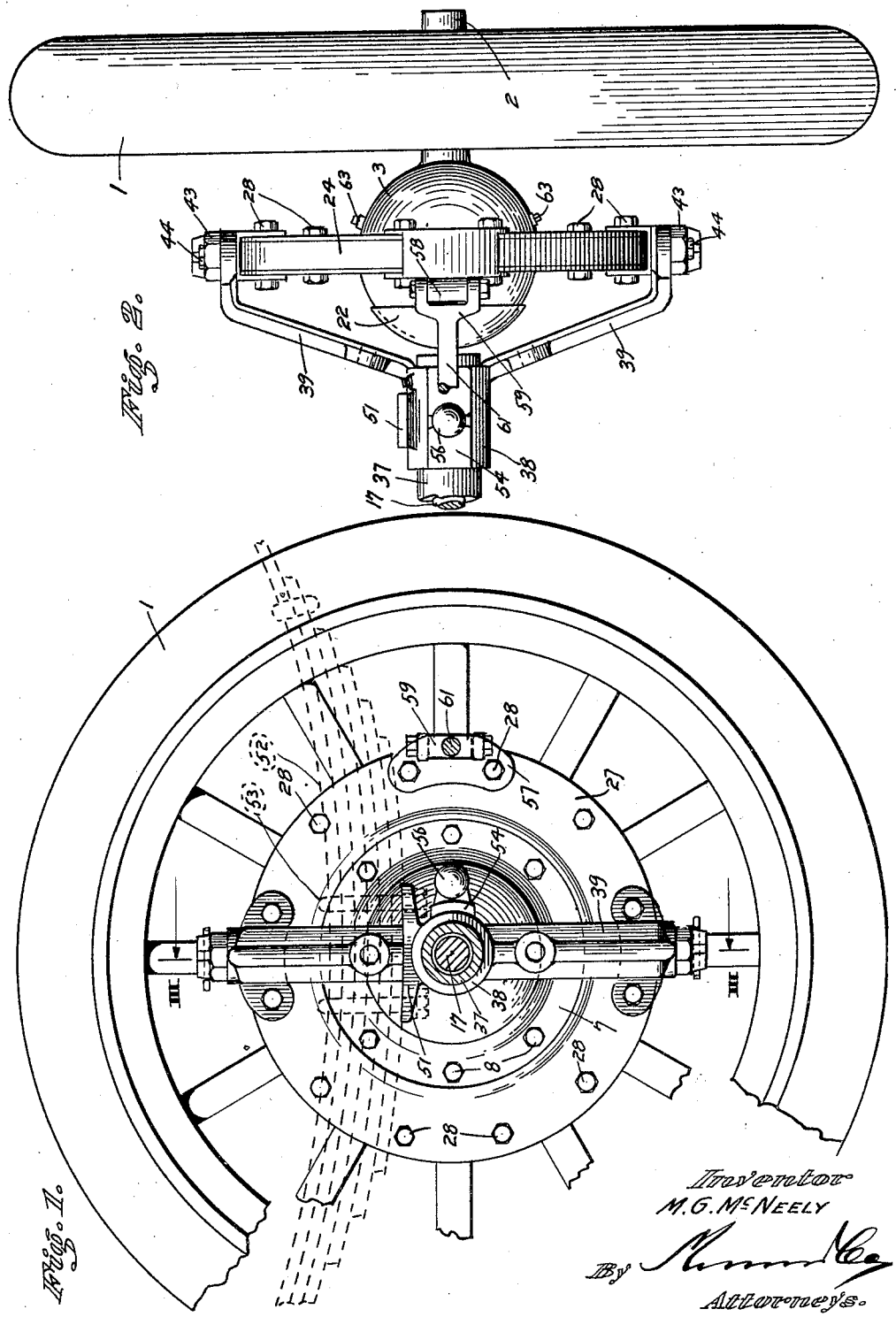
Inventor
M. G. McNeely
By
Attorneys.

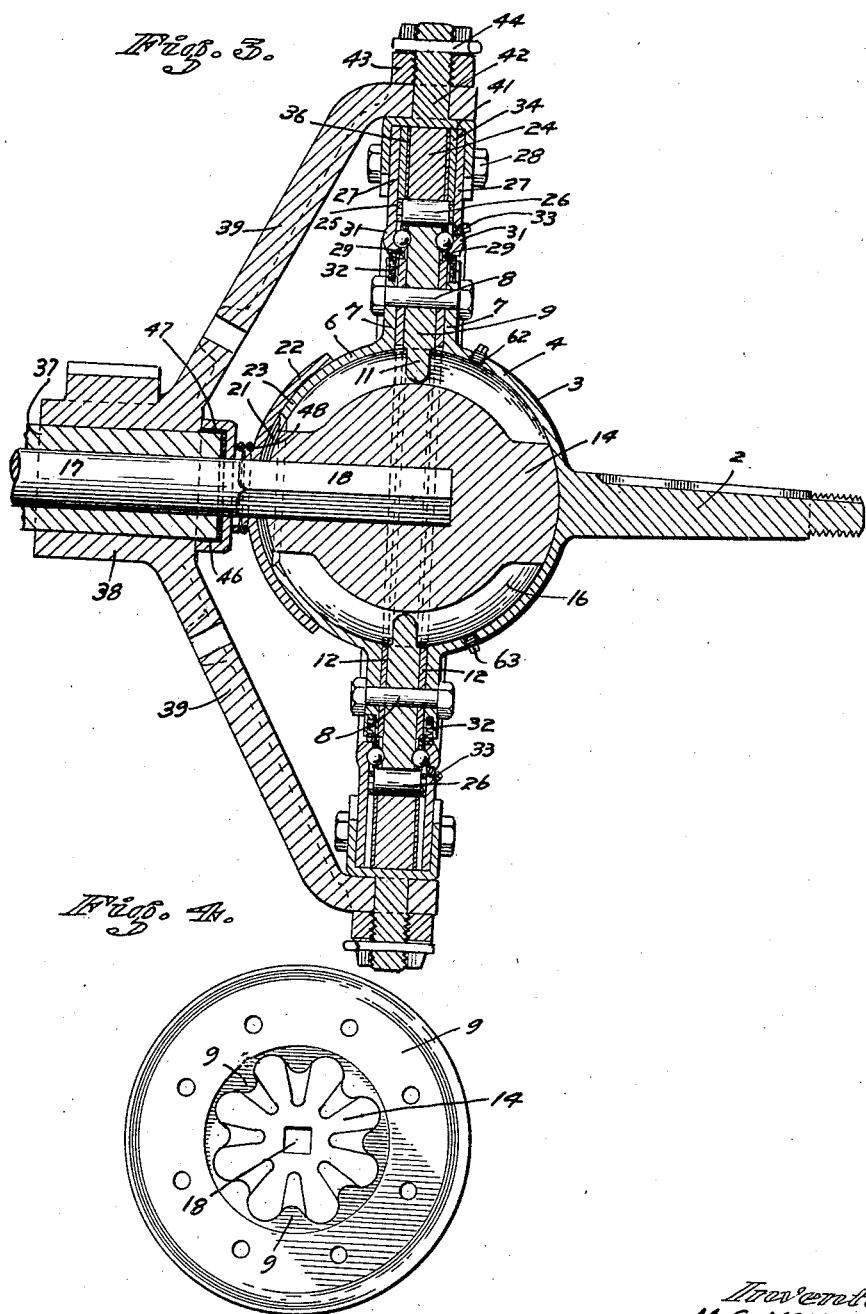

Patented Mar. 27, 1923.

1,450,099

UNITED STATES PATENT OFFICE.

MARION GERARD McNEELY, OF TULARE, CALIFORNIA.

FRONT DRIVE FOR MOTOR VEHICLES.

Application filed October 15, 1921. Serial No. 507,915.

*To all whom it may concern:*

Be it known that I, MARION GERARD McNEELY, a citizen of the United States, and a resident of Tulare, county of Tulare, and State of California, have invented a new and useful Front Drive for Motor Vehicles, of which the following is a specification.

The present invention relates to improvements in motor vehicles and has particular reference to a combination driving and steering device for the same such as is commonly known as a front drive. The principal object of the invention is to provide a suitable connection between the front axle of a motor vehicle and the wheels allowing the latter to be driven by the front axle and at the same time allowing of pivotal motion of the wheels on the axle whereby the motor vehicle may be steered. One of the principal features of my device is the universal joint such as is described in my co-pending application Serial No. 458916 and my present device constitutes a further application of the said universal joint.

The preferred form of my invention is illustrated in the accompanying drawing in which Figure 1 represents a side view of one of the front wheels of a motor vehicle looking at it from the inside so that the axle appears in cross section; Figure 2 is a rear view of the same wheel and my attachment; Figure 3 an enlarged cross sectional detail view of my attachment drawn along line 3—3 of Figure 1, and Figure 4 a detail view of a universal joint used in my device.

While in the following description I shall refer to my device as a front drive, it will be understood that it may as well be used as a rear drive for a motor vehicle, the term front drive being used for convenience only in view of the fact that practically all motor vehicles of the present day have their steering mechanism connected with the front wheels.

The wheel (1) of the motor vehicle is rigidly secured on the spindle (2) extending from the socket (3), which latter comprises two substantially semi-spherical portions (4) and (6) having flanges (7) thereon which are joined by means of bolts (8) and receive between the same the ring (9) provided with internal teeth (11). To insure an oil tight connection between the ring and the flanges of the semi-spherical portions (4) and (6) I use packing rings (12) between the same. Inside the socket I provide the ball pinion (14) provided with ribs (16) adapted to engage the teeth (11) of the ring (9). This latter pinion is engaged by the axle (17) of the vehicle, a square portion (18) extending into the pinion. Rotary motion is imparted to the axle (17) by means not shown in the drawing. The socket member (6) is provided with an axial perforation (21) of a size considerably larger than the diameter of the axle so as to allow of free play of the latter within the same. The perforation is covered by a concave cap (22) fitting on the axle (17) and supported on the same so that it freely rides on the edge (23) defining the perforation (21) and covers the latter in any position the socket may ordinarily assume with reference to the axle (17).

Rotatably supported on the toothed ring (9) is the ring (24), rollers (26) supported in rings (25) being interposed between the two rings (9) and (24) and the latter two being held in alinement by two co-operating annular members (27) secured to the ring (24) by means of bolts (28) and extending over the outer portion of the ring (9). Ball races (29) are provided on either side of the ring (9) and engage outwardly curved portions (31) of the members (27) to guard against frictional losses, and suitable packing rings (32) embedded in the flanges (7) and contacting the members (27) prevent dust from entering the bearings. The oil caps (33) may be unscrewed to allow of the admission of a lubricant into the bearings. Between the annular members (27) and the ring (24) I introduce packing rings (34) and packing material (36).

The axle housing (37), only partly shown in the drawing, is provided with a sleeve (38) from which extends a yoke (39), the two ends of which are adapted to span the ring (24) and to be screwed to the same by two clips (41) secured to the ring by means of the bolts (28) previously mentioned and having pins (42) extending in radial direction and penetrating the ends of the yoke (39), the latter being secured by means of the nuts (43) held against rotation by the cotter pins (44). It will be seen that this manner of securing the axle housing on the ring (24) allows of pivotal motion between the same on the pins (42). To prevent dust from entering between the axle and the axle housing I provide a cap (46) and packing

(47) between the cap and the axle housing. A spring (48) is introduced between the cap (46) and the cap (22) and serves to hold the latter cap in firm sliding contact with the socket member (6).

The sleeve (38) secured on the axle housing is provided with a plate (51) adapted to receive the vehicle spring (52) which is secured to the plate by means of suitable clamps (53). The sleeve is also provided with a bracket (54) carrying the ball (56) adapted to engage one of the radius rods of the motor vehicle not shown in the drawing. The ring (24) is provided with an additional clip (57) secured to the same by means of the bolts (28) previously mentioned and carrying a sleeve (58) adapted to engage the forked end (59) of the steering rod (61) only partly shown in the drawing. The universal joint is oiled through oil holes (62) adapted to be closed by the caps (63).

In operation it will be readily understood that when the axle (17) is rotated by means of a differential gear not shown in the drawing its rotary motion will be transmitted to the ball pinion (14) and through it to the toothed ring (9), which latter forms a part of the socket (3) and transmits its motion to the wheel (1) secured on the spindle (2). When it is desired to change the direction of the wheel (1) relative to the travel of the motor vehicle the steering rod (61) is actuated on by the steering wheel in the hand of the driver, whereby the ring (24) is caused to pivot on the pin (42) and to change its position in the desired direction causing the wheel (1) to change its position correspondingly. Since the rotary motion is transmitted from the axle to the wheel by means of the universal joint the steering of the wheel will not interfere with the transmission of power.

I claim:

In a device of the character described, an axle having a ball pinion rigidly secured to its end with a plurality of peripheral ribs on said pinion, a stationary housing on said axle, a wheel spindle normally alined with the axle having a ball socket rigidly secured thereto, a transversely disposed ring secured in said socket having a plurality of internal teeth engaging the ribs, a second ring peripherally and rotatably engaging the first ring, guiding members for maintaining the rings in alinement, peripheral clips having radial shafts extending therefrom secured to said second ring, a yoke on the housing pivotally engaging said shafts, and means associated with the second ring whereby the spindle may be brought into angular relation to the axle.

MARION GERARD McNEELY.